United States Patent
Nihei

(10) Patent No.: US 12,500,624 B2
(45) Date of Patent: Dec. 16, 2025

(54) ANTENNA TUNING INTEGRATED CIRCUIT

(71) Applicants: Kabushiki Kaisha Toshiba, Tokyo (JP); Toshiba Electronic Devices & Storage Corporation, Tokyo (JP)

(72) Inventor: Ryuichi Nihei, Saitama Saitama (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 308 days.

(21) Appl. No.: 18/234,007

(22) Filed: Aug. 15, 2023

(65) Prior Publication Data
US 2024/0297678 A1  Sep. 5, 2024

(30) Foreign Application Priority Data
Mar. 3, 2023  (JP) .................. 2023-032691

(51) Int. Cl.
*H04B 1/44*  (2006.01)
*H01Q 3/24*  (2006.01)

(52) U.S. Cl.
CPC .................. *H04B 1/44* (2013.01); *H01Q 3/24* (2013.01)

(58) Field of Classification Search
CPC ..................... H04B 1/44; H01Q 3/24
See application file for complete search history.

(56) References Cited

U.S. PATENT DOCUMENTS

| | | | |
|---|---|---|---|
| 9,577,626 B2 | 2/2017 | Crandall et al. | |
| 10,931,193 B2 | 2/2021 | Tokuda et al. | |
| 2004/0242182 A1* | 12/2004 | Hidaka | H04B 1/44 455/333 |
| 2021/0013922 A1* | 1/2021 | Watanabe | H04B 1/44 |

FOREIGN PATENT DOCUMENTS

| | | |
|---|---|---|
| JP | 5780178 B2 | 9/2015 |
| JP | 6401378 B2 | 10/2018 |
| JP | 6856121 B2 | 4/2021 |

* cited by examiner

*Primary Examiner* — David Bilodeau
(74) *Attorney, Agent, or Firm* — Knobbe, Martens, Olson & Bear, LLP

(57) ABSTRACT

According to one embodiment, an antenna tuning IC includes a power level detection circuit, a signal level determination circuit, and a consumption current control circuit. The power level detection circuit detects a power level of an antenna line through which a high-frequency signal received by an antenna is transmitted. The signal level determination circuit determines a signal level detected by the power level detection circuit. The consumption current control circuit generates a switch gate control signal for controlling an ON/OFF operation of an RF switch circuitry, and reduces a first consumption current generated when the power level is a low input voltage more than a second consumption current generated when the power level is a high input voltage based on a determination result of the signal level determination circuit.

11 Claims, 11 Drawing Sheets

"PRIOR ART"

"at high input voltage"

"at low input voltage"          "at low input voltage"

N1: low → high → low

N2: low → high → low (Vref dashed reference)

N3: low → high → low

N6: −1.5V → −3.0V → −1.5V comsumption current: small → large → small (0 dashed reference)

Fig. 3

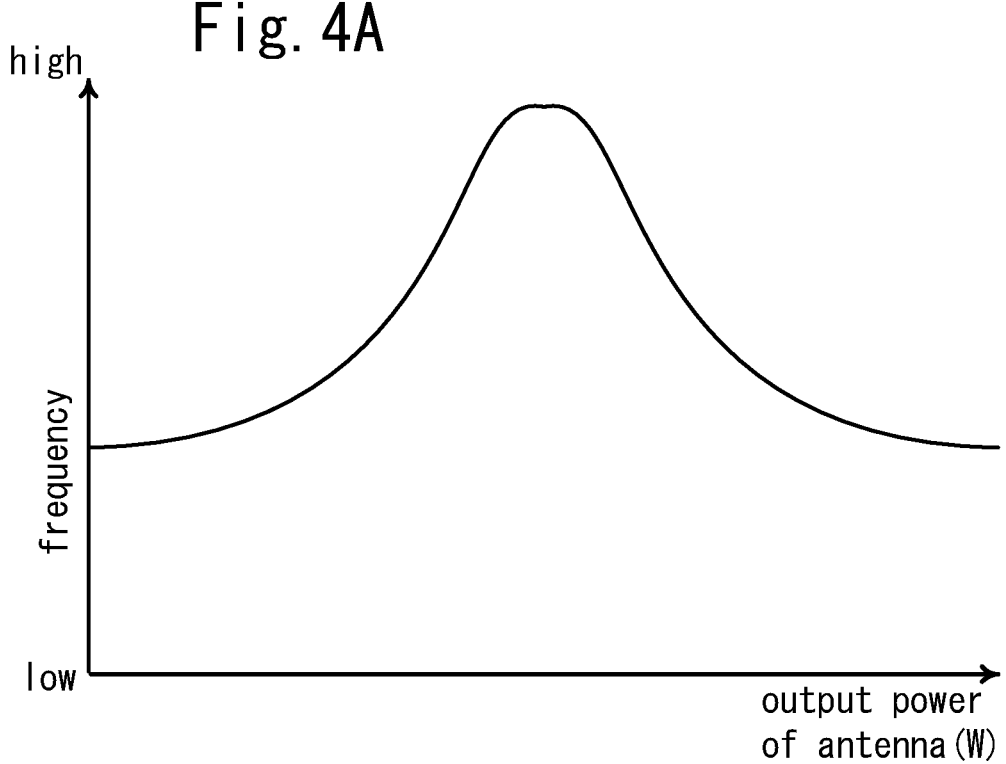
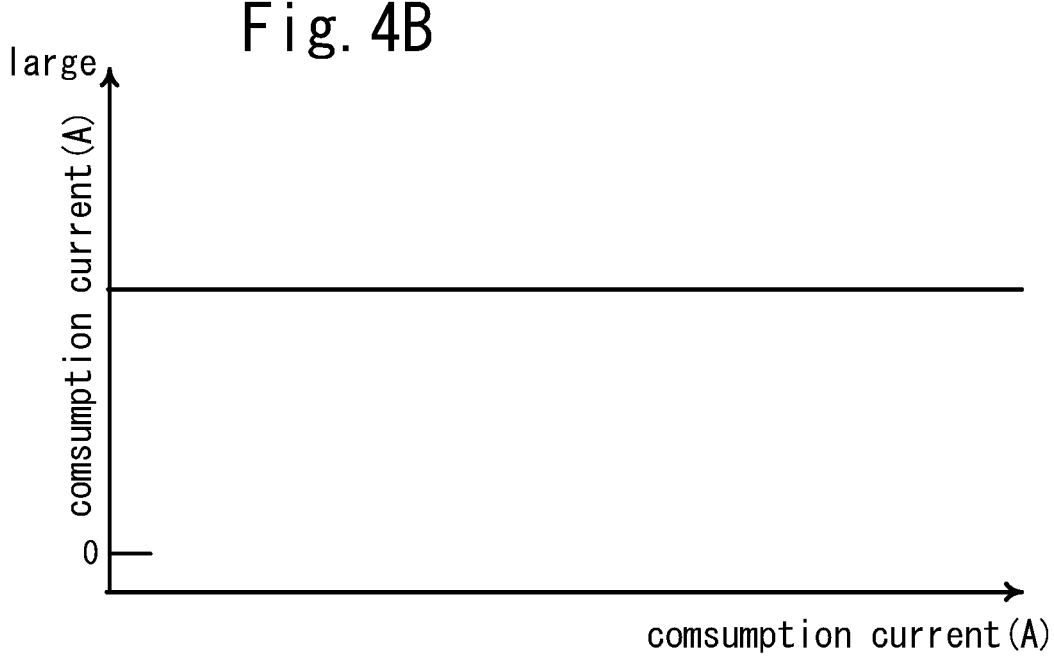

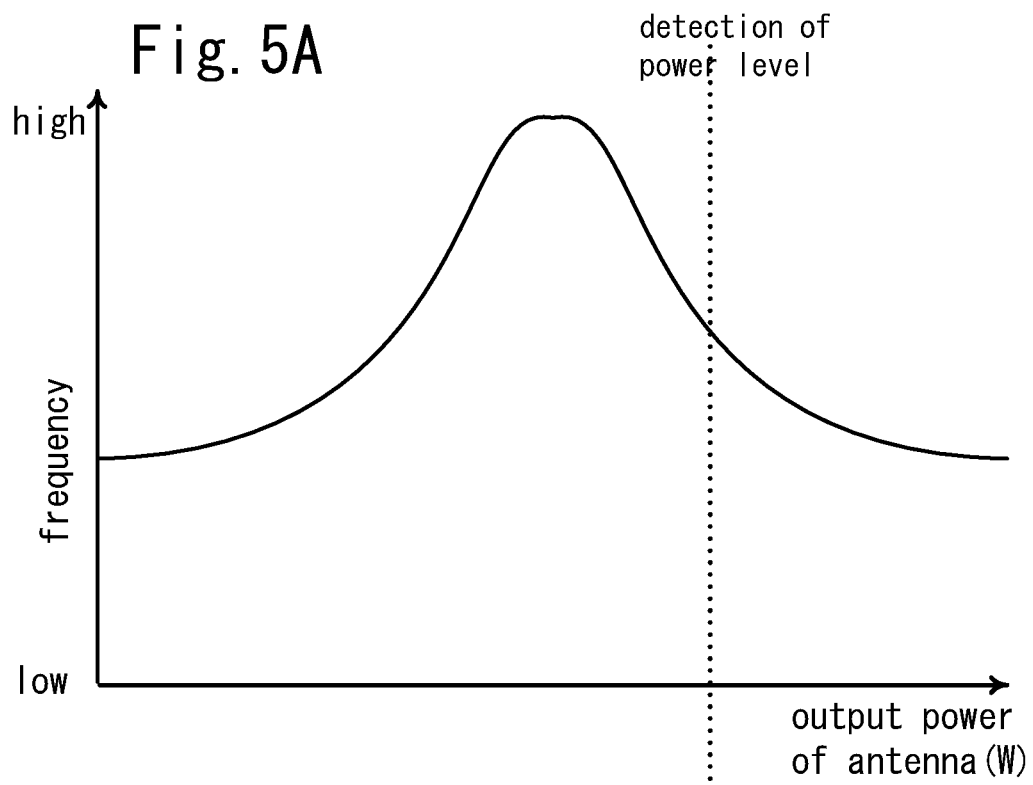
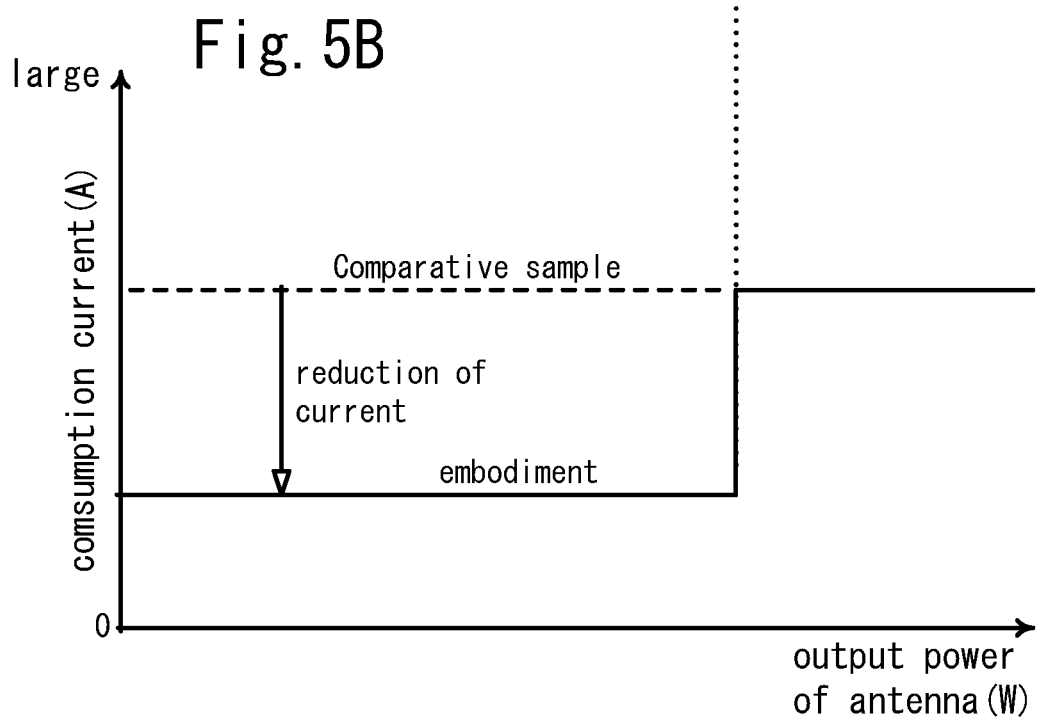

ANTENNA TUNING INTEGRATED CIRCUIT

CROSS REFERENCE TO RELATED APPLICATION

This application is based upon and claims the benefit of priority from the prior Japanese Patent Application No. 2023-032691, filed on Mar. 3, 2023, the entire contents of which are incorporated herein by reference.

FIELD

Embodiments described herein are antenna tuning ICs.

BACKGROUND

An antenna tuning IC is installed near an antenna used in mobile communications and the like, and is used for antenna aperture tuning to adjust the antenna to a good position for radio waves by using the switching of a switch.

Since the antenna tuning IC is installed near the antenna, a high RF withstanding voltage is required, and a consumption current increases due to the high withstanding voltage operation. In the field of mobile communications, low power consumption is essential. For this reason, in the antenna tuning IC installed in the analog front end unit, there is a strong demand from users for lower power consumption.

BRIEF DESCRIPTION OF THE DRAWINGS

FIG. 3 is a timing chart showing the operation of the antenna tuning IC according to the first embodiment.

FIG. 4A is a diagram showing the operation of the antenna tuning IC of the comparative example showing a relationship between antenna output power and a frequency, and FIG. 4B is a diagram showing the operation of the antenna tuning IC of the comparative example showing a relationship between antenna output power and consumption current.

FIG. 5A is a diagram showing the operation of the antenna tuning IC of the first embodiment showing a relationship between antenna output power and a frequency, and FIG. 5B is a diagram showing the operation of the antenna tuning IC of the first embodiment showing a relationship between antenna output power and consumption current.

DETAILED DESCRIPTION

Figure 1:
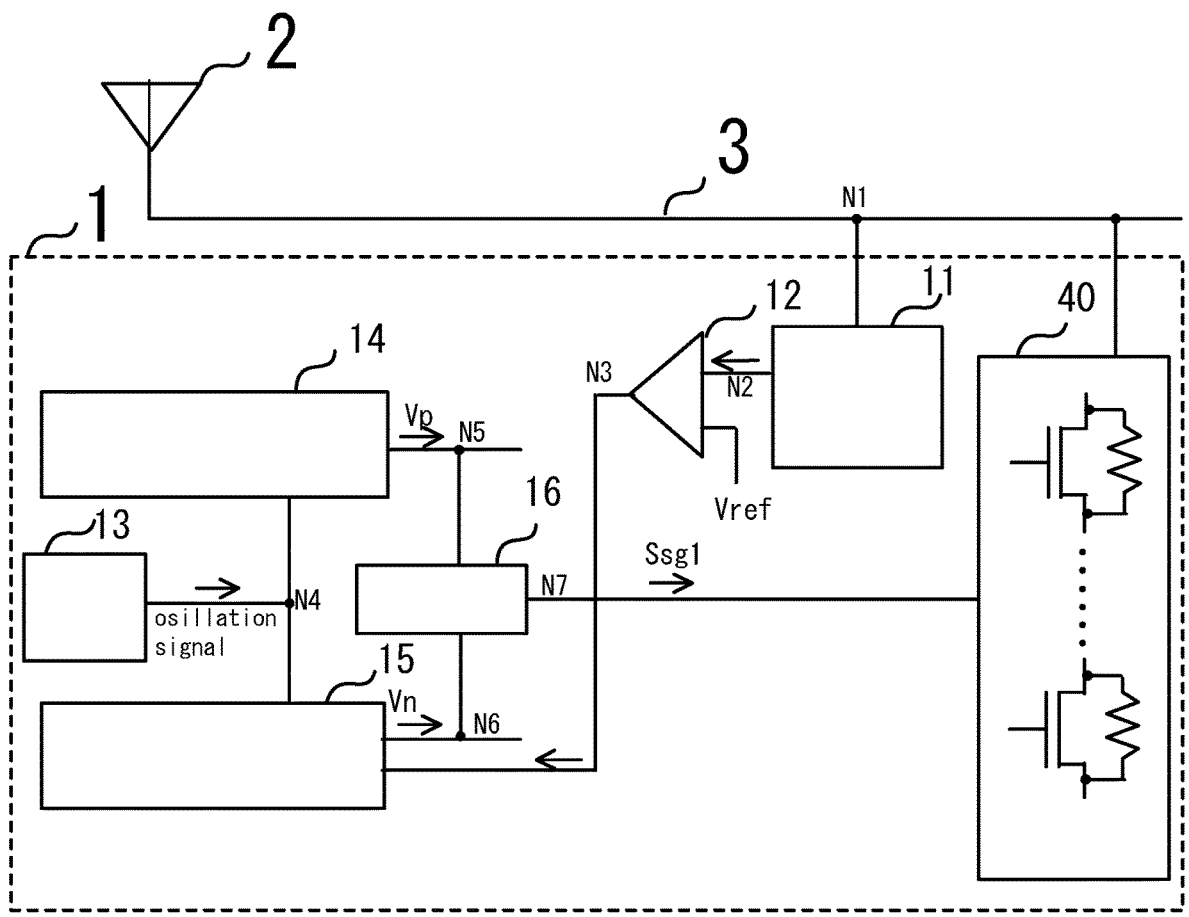
FIG. 1 is a circuit diagram showing an antenna tuning IC according to a first embodiment.

According to one embodiment, an antenna tuning IC includes a power level detection circuit, a signal level determination circuit, and a consumption current control circuit. The power level detection circuit detects a power level of an antenna line through which a high-frequency signal received by an antenna is transmitted. The signal level determination circuit determines a signal level detected by the power level detection circuit. The consumption current control circuit generates a switch gate control signal for controlling an ON/OFF operation of an RF switch circuitry, and reduces a first consumption current generated when the power level is a low input voltage more than a second consumption current generated when the power level is a high input voltage based on a determination result of the signal level determination circuit.

Hereinafter, a plurality of further embodiments will be described with reference to the drawings. In the drawings, the same reference numerals indicate the same or similar portions.

An antenna tuning IC according to a first embodiment will be described with reference to the drawings. FIG. 1 is a circuit diagram showing the antenna tuning IC.

In the first embodiment, there are provided a power level detection circuit that detects the power level of an antenna line, a signal level determination circuit that determines the detected signal level, an RF switch circuitry including multi-stage MOS transistors, and a consumption current control circuit that controls ON/OFF of the RF switch circuitry and varies the signal level of a switch gate control signal input to gates of the multi-stage MOS transistors based on a signal level determination result. A first consumption current generated when the power level of the antenna line is a low input voltage is reduced more than a second consumption current generated when the power level of the antenna line is a high input voltage.

Figure 11:
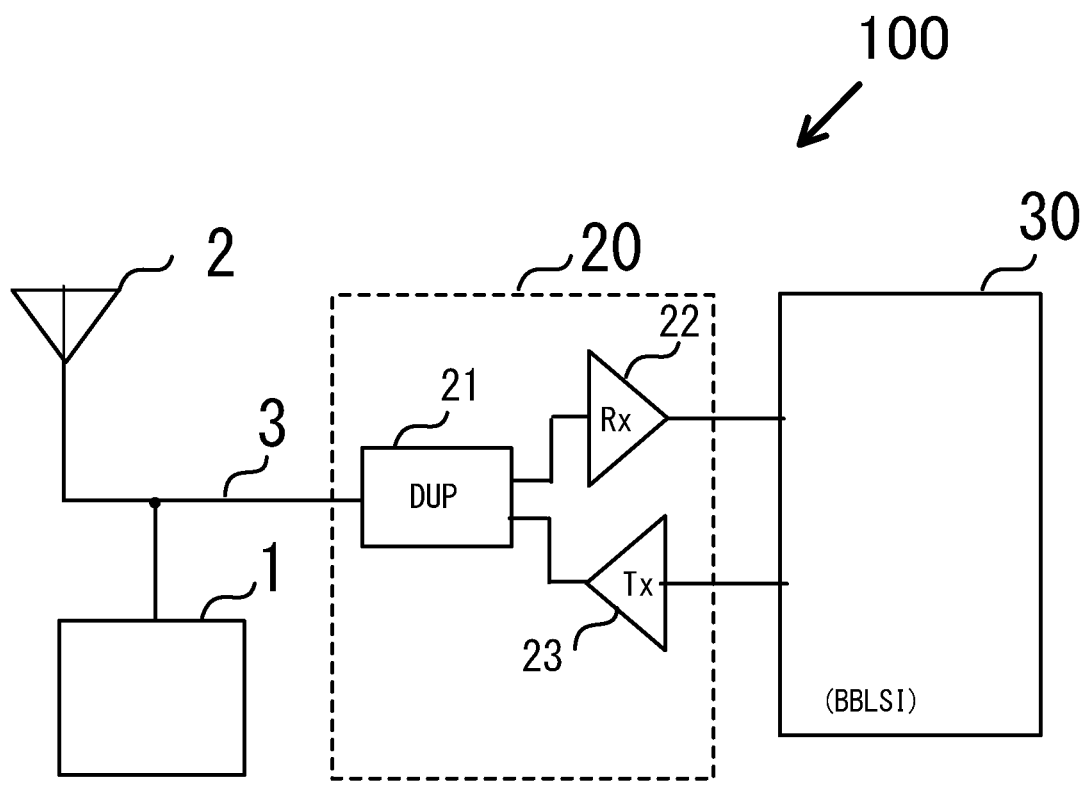
FIG. 11 is a schematic explanatory diagram of a mobile phone communication module in which an antenna tuning IC is mounted.

An antenna tuning IC1 is applied to various radio communication systems. The antenna tuning IC1 is mounted on an analog front end of a mobile phone communication module used in smart phones, mobile phone terminals, and the like shown in FIG. 11, for example. Specifically, a mobile phone communication module 100 includes the antenna tuning IC1, an antenna 2, an antenna line 3, an analog front end module (AFE module) 20, and an RF communication processing unit (BBLSI) 30. In addition, the antenna tuning IC1 is used in mobile terminals, for example.

The antenna 2 receives a high-frequency radio signal. The antenna line 3 transmits the signal received by the antenna 2. The antenna tuning IC1 is provided near the antenna 2 (between the antenna 2 and the analog front end module 20), and is used for antenna aperture tuning to adjust the antenna to a good position for radio waves by using the switching of a switch. The analog front end module 20 includes a duplexer 21, a receiving unit 22, and a transmission unit 23. The duplexer 21 is connected to the antenna line 3 and performs switching between transmission and reception for radio communication. The receiving unit 22 amplifies a reception signal for radio communication output from the duplexer 21 and outputs the amplified signal to the RF communication processing unit (BBLSI) 30. The transmission unit 23 amplifies a signal for communication processing output from the RF communication processing unit (BBLSI) 30 and outputs the amplified signal to the duplexer 21. The RF communication processing unit (BBLSI) 30 is a baseband LSI that performs various processes related to transmission and reception in RF communication.

As shown in FIG. 1, the antenna tuning IC1 is connected to the antenna line 3 through which a reception signal output from the antenna 2 that receives a high-frequency radio wave signal is transmitted. The antenna tuning IC1 includes a full-wave rectifier circuit 11, a comparator 12, a ring oscillator 13, a boost charge pump circuit/boost regulator 14, a step-down charge pump circuit/step-down regulator 15, a level shifter 16, and an RF switch circuitry 40.

The full-wave rectifier circuit 11 (power level detection circuit) receives a reception signal received by the antenna 2 through the antenna line 3. The full-wave rectifier circuit 11 functions as a power level detection circuit that detects the power level (node N1) of the antenna line 3. The full-wave rectifier circuit 11 outputs the absolute value of the input voltage, and is also called an absolute value circuit. The full-wave rectifier circuit 11 has a function of converting the input voltage from AC (AC voltage) to DC (DC voltage).

The comparator 12 (signal level determination circuit) receives an output (signal at node N2) of the full-wave rectifier circuit 11 and a reference voltage Vref, compares the output (signal at node N2) of the full-wave rectifier circuit 11 with the reference voltage Vref, and outputs an amplified signal after comparison. The comparator 12 functions as a signal level determination circuit that determines the signal level of the full-wave rectifier circuit 11. The comparator 12 outputs a low level ("L") signal when the output (signal at node N2) of the full-wave rectifier circuit 11 is lower than the reference voltage Vref, and outputs a high level ("H") signal when the output (signal at node N2) of the full-wave rectifier circuit 11 is higher than the reference voltage Vref.

The ring oscillator 13 functions as an oscillator that generates an oscillation signal. The boost charge pump circuit/boost regulator 14 receives the oscillation signal (signal at node N4) output from the ring oscillator 13. The boost charge pump circuit generates a boosted voltage Vp based on the oscillation signal (output at node N4) that is an output of the ring oscillator 13. The boost regulator feedback-processes the boosted voltage Vp generated by the boost charge pump circuit to keep the boosted voltage Vp at a constant value. The boosted voltage Vp is a positive voltage.

The step-down charge pump circuit/step-down regulator 15 receives the oscillation signal (signal at node N4) output from the ring oscillator 13 and the output (signal at node N3) of the comparator 12. The step-down charge pump circuit generates a stepped-down voltage Vn based on the oscillation signal (output at node N4) that is an output of the ring oscillator 13. The step-down regulator feedback-processes the stepped-down voltage Vn generated by the step-down charge pump circuit, and generates two types of stepped-down voltages Vn having different voltage values based on the output (signal at node N3) of the comparator 12. Specifically, when the output of the comparator 12 is at a low level ("L"), the stepped-down voltage Vn is set to a first negative voltage. When the output of the comparator 12 is at a high level ("H"), the stepped-down voltage Vn is set to a second negative voltage at a deep level having a larger absolute value than the first negative voltage.

A Dickson type charge pump circuit, a charge pump circuit using a bootstrap gate transfer switch, and the like are used as a boost charge pump circuit (boosting circuit) and a step-down charge pump circuit (step-down circuit). A switching type DC/DC converter and the like are used as a boost regulator and a step-down regulator.

The level shifter 16 receives an output (signal at node N5 (boosted voltage Vp)) of the boost charge pump circuit/boost regulator 14 and an output (signal at node N6 (stepped-down voltage Vn)) of the step-down charge pump circuit/step-down regulator 15, generates a level-shifted signal, and outputs the level-shifted signal to the RF switch circuitry 40 as a switch gate control signal Ssg1. The switch gate control signal Ssg1 output from the level shifter 16 is set to the boosted voltage Vp at the time of high level and set to the stepped-down voltage Vn at the time of low level. The RF switch circuitry 40 is turned on and off by the switch gate control signal Ssg1 output from the level shifter 16.

The ring oscillator 13, the boost charge pump circuit/boost regulator 14, the step-down charge pump circuit/step-down regulator 15, and the level shifter 16 control ON/OFF of the RF switch circuitry 40, and function as a consumption current control circuit that controls the consumption current of the antenna tuning IC1.

The RF switch circuitry 40 includes multi-stage MOSFETs connected in cascade. The RF switch circuitry 40 receives the switch gate control signal Ssg1 (signal at node N7) output from the level shifter 16, and performs ON/OFF operations based on the switch gate control signal Ssg1. The reason why the voltage when the switch gate control signal Ssg1 is at the low level is set to a negative voltage is to secure the off-state withstanding voltage of the RF switch circuitry 40 when the power level of the antenna line is a high input voltage.

Figure 2:
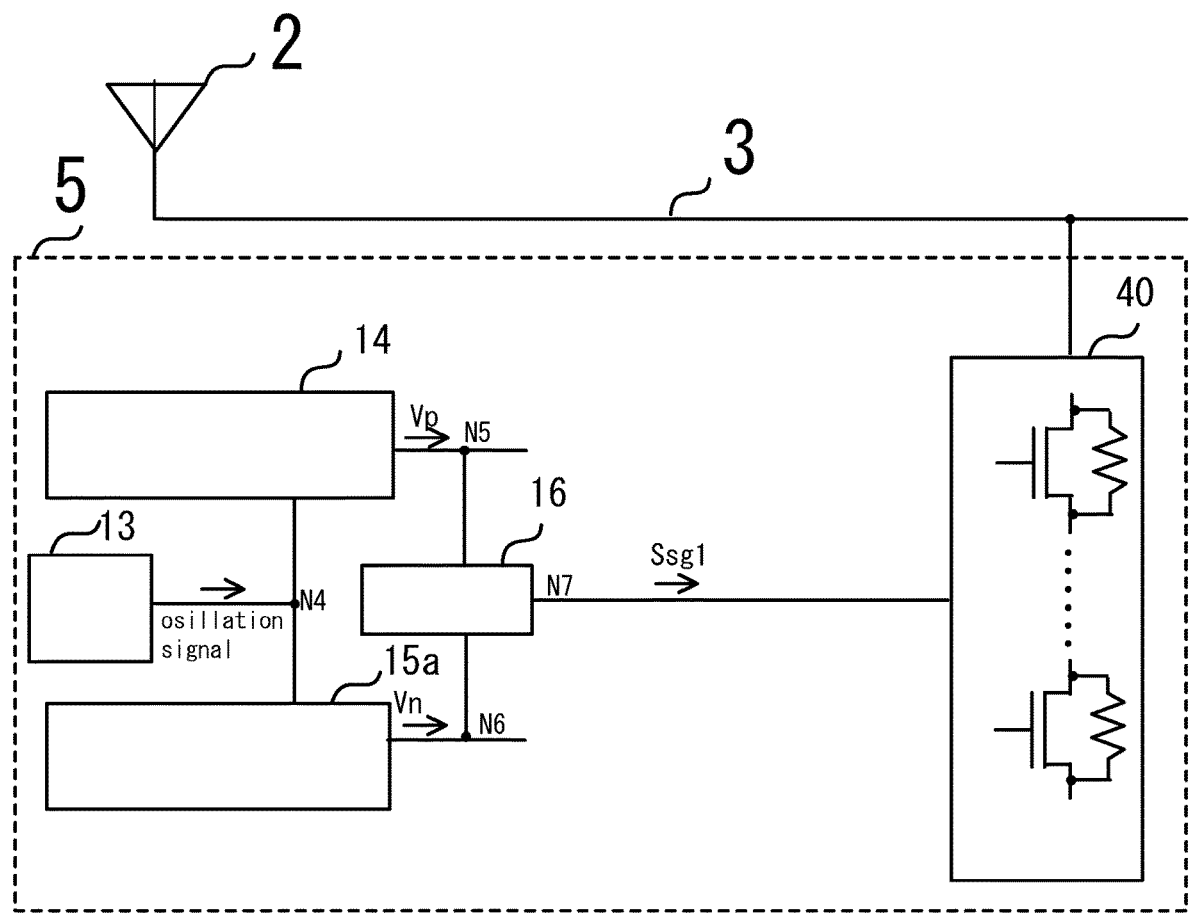
FIG. 2 is a circuit diagram showing an antenna tuning IC of a comparative example.

Next, an antenna tuning IC of a comparative example will be described with reference to FIG. 2. FIG. 2 is a circuit diagram showing the antenna tuning IC of the comparative example.

As shown in FIG. 2, an antenna tuning IC5 of the comparative example includes the ring oscillator 13, the boost charge pump circuit/boost regulator 14, a step-down charge pump circuit/step-down regulator 15a, the level shifter 16, and the RF switch circuitry 40. The full-wave rectifier circuit 11 and the comparator 12 of the antenna tuning IC1 according to the embodiment are not provided in the antenna tuning IC5 of the comparative example. Explanations of the same component portions as in the antenna tuning IC1 according to the embodiment will be omitted, and only different portions will be described.

The step-down charge pump circuit/step-down regulator 15a receives an oscillation signal (signal at node N4) output from the ring oscillator 13. The step-down charge pump circuit generates a stepped-down voltage Vn based on the oscillation signal (output at node N4) that is an output of the ring oscillator 13. The step-down regulator feedback-processes the stepped-down voltage Vn generated by the step-down charge pump circuit to generate the stepped-down voltage Vn that is a constant voltage.

In the antenna tuning IC5 of the comparative example, the low level of a switch control signal ssg1 for controlling the ON/OFF operations of multi-stage MOS transistors of the RF switch circuitry 40 is set to the stepped-down voltage Vn, which is a constant negative voltage, regardless of the high input voltage or low input voltage of the power level of the antenna line.

Next, an operation of the antenna tuning IC will be described with reference to FIGS. 3, 4A, and 4B. FIG. 3 is a timing chart showing the operation of the antenna tuning IC according to the embodiment. FIG. 4A is a diagram showing the operation of the antenna tuning IC of the comparative example showing a relationship between antenna output power and a frequency, and FIG. 4B is a diagram showing the operation of the antenna tuning IC of the comparative example showing a relationship between antenna output power and consumption current. In addition, in the timing chart of FIG. 3, it is simply shown that voltages are input to the antenna line in the order of low input voltage→high input voltage→low input voltage.

As shown in FIG. 3, in the antenna tuning IC1, the full-wave rectifier circuit 11 receives a reception signal received by the antenna 2 through the antenna line 3 (node N1). The full-wave rectifier circuit 11 detects the power level of the antenna line 3. The full-wave rectifier circuit 11 outputs a low voltage when the power level of the antenna line 3 is a low input voltage, and outputs a high voltage when the power level of the antenna line 3 is a high input voltage.

The comparator 12 receives an output signal of the full-wave rectifier circuit 11. The comparator 12 outputs a low level ("L") signal when the output of the full-wave rectifier circuit 11 falls below the reference voltage Vref, and outputs a high level ("H") signal when the output of the full-wave rectifier circuit 11 exceeds the reference voltage Vref.

The step-down charge pump circuit/step-down regulator 15 receives the output signal of the comparator 12. When the output of the comparator 12 is at a low level ("L"), the step-down charge pump circuit/step-down regulator 15 generates a stepped-down voltage Vn of −1.5 V, for example, and outputs the generated stepped-down voltage Vn to the level shifter 16. When the output of the comparator 12 is at a high level ("H"), the step-down charge pump circuit/step-down regulator 15 generates a stepped-down voltage Vn of −3.0 V, for example, and outputs the generated stepped-down voltage Vn to the level shifter 16.

In the antenna tuning IC1 according to the embodiment, when the power level of the antenna line 3 is a low input voltage, the step-down charge pump circuit/step-down regulator 15 generates a stepped-down voltage Vn of −1.5 V. When the power level of the antenna line 3 is a high input voltage, the step-down charge pump circuit/step-down regulator 15 generates a stepped-down voltage Vn of −3.0 V. The operating current (first operating current) of the step-down charge pump circuit/step-down regulator 15 when generating a stepped-down voltage Vn of −1.5 V is smaller than the operating current (second operating current) of the step-down charge pump circuit/step-down regulator 15 when generating a stepped-down voltage Vn of −3.0 V because the capability of the charge pump can be suppressed. As a result, the consumption current of the antenna tuning IC1 when the power level of the antenna line 3 is a low input voltage can be reduced more than the consumption current of the antenna tuning IC1 when the power level of the antenna line 3 is a high input voltage.

In the antenna tuning IC5 of the comparative example, regardless of the power level of the antenna line 3, the step-down charge pump circuit/step-down regulator 15a generates a stepped-down voltage Vn of −3.0 V, for example.

Therefore, as shown in FIG. 4B, the consumption current of the antenna tuning IC5 is constant regardless of the output power of the antenna 2.

Figure 6:
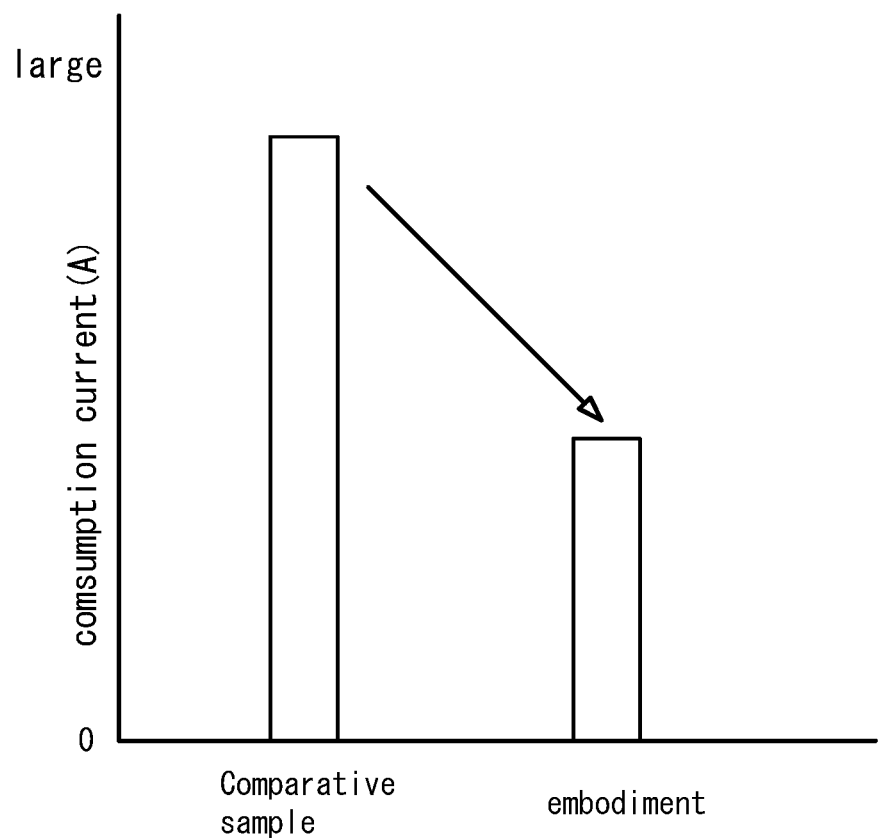
FIG. 6 is a comparison diagram of consumption current between the antenna tuning IC according to the first embodiment and the antenna tuning IC of the comparative example.

Next, the consumption current of the antenna tuning IC will be described with reference to FIGS. 5A, 5B, and 6. FIG. 5A is a diagram showing the operation of the antenna tuning IC of the first embodiment showing a relationship between antenna output power and a frequency, and FIG. 5B is a diagram showing the operation of the antenna tuning IC of the first embodiment showing a relationship between antenna output power and consumption current. FIG. 6 is a comparison diagram of the consumption current of the antenna tuning IC according to the embodiment and the consumption current of the antenna tuning IC of the comparative example. In addition, in FIG. 5B, the consumption current of the antenna tuning IC of the comparative example is indicated by the dashed line.

As shown in FIGS. 5A and 5B, in the antenna tuning IC, the output power of the antenna changes with a frequency. The frequency is low in a region where the output power of the antenna is small, and the frequency increases as the output power of the antenna increases and reaches a peak at a certain point. Then, the frequency decreases. This has a normal distribution shape, for example.

In the antenna tuning IC1 according to the embodiment, when the output power of the antenna 2 becomes equal to or lower than the detection power level, which is a predetermined value, the step-down charge pump circuit/step-down regulator 15 generates a stepped-down voltage Vn of −1.5 V. Therefore, the consumption current of the antenna tuning IC1 according to the embodiment can be reduced more than the consumption current of the antenna tuning IC5 of the comparative example indicated by the dashed line.

As shown in FIG. 6, the consumption current generated during the operation of the antenna tuning IC1 according to the embodiment can be reduced by 48%, for example, compared with the consumption current generated during the operation of the antenna tuning IC5 of the comparative example. Here, the comparative diagram of the consumption current of the antenna tuning IC shown in FIG. 6 is an example when the detection power level is set to a predetermined value, the frequency distribution of the output power of the antenna 2 shows a normal distribution (see FIG. 5A), and the antenna tuning IC is mounted in the smartphone. If a communication frequency or the frequency of communications in a mobile phone terminal, a mobile terminal, and the like is different, the effect of reducing the consumption current is different.

As described above, the full-wave rectifier circuit 11, the comparator 12, the ring oscillator 13, the boost charge pump circuit/boost regulator 14, the step-down charge pump circuit/step-down regulator 15, the level shifter 16, and the RF switch circuitry 40 are provided in the antenna tuning IC1 according to the embodiment. The full-wave rectifier circuit 11 functions as a power level detection circuit that detects the power level of the antenna line 3. The comparator 12 functions as a signal level determination circuit that determines the signal level detected by the full-wave rectifier circuit 11. The ring oscillator 13, the boost charge pump circuit/boost regulator 14, the step-down charge pump circuit/step-down regulator 15, and the level shifter 16 control the ON/OFF operation of the RF switch circuitry 40, and function as a consumption current control circuit that controls the consumption current of the antenna tuning IC1. Based on the determination result output from the comparator 12, the step-down charge pump circuit/step-down regulator 15 generates a stepped-down voltage Vn of −1.5 V when the power level of the antenna line 3 is a low input voltage, and generates a stepped-down voltage Vn of −3.0 V when the power level of the antenna line 3 is a high input voltage. The level shifter 16 receives the boosted voltage Vp, which is a constant voltage generated by the boost charge pump circuit/boost regulator 14, and a stepped-down voltage Vn of −1.5 V and a stepped-down voltage Vn of −3.0 V generated by the step-down charge pump circuit/step-down regulator 15. The level shifter 16 outputs to the RF switch circuitry 40 the switch gate control signal Ssg1, which is set to the boosted voltage Vp at the time of high level, is set to a stepped-down voltage Vn of −3.0 V at the time of low level and when the power level is a high input voltage, and is set to a stepped-down voltage Vn of −1.5 V at the time of low level and when the power level is a low input voltage.

For this reason, the first consumption current of the antenna tuning IC1 generated when the power level is a low input voltage can be reduced more than the second consumption current of the antenna tuning IC1 generated when the power level is a high input voltage. Therefore, the power consumption of the antenna tuning IC1 can be reduced.

In addition, although the boost charge pump circuit/boost regulator 14 and the step-down charge pump circuit/step-down regulator 15 are used in the antenna tuning IC1 according to the embodiment, the antenna tuning IC1 is not necessarily limited to this. Instead of the boost regulator, a comparator for feedback operation that performs a boosted voltage feedback operation may be used, for example. Instead of the step-down regulator, a selector that receives the output of the comparator 12 and a comparator for feedback operation that performs a stepped-down voltage feedback operation may be used.

Figure 7:
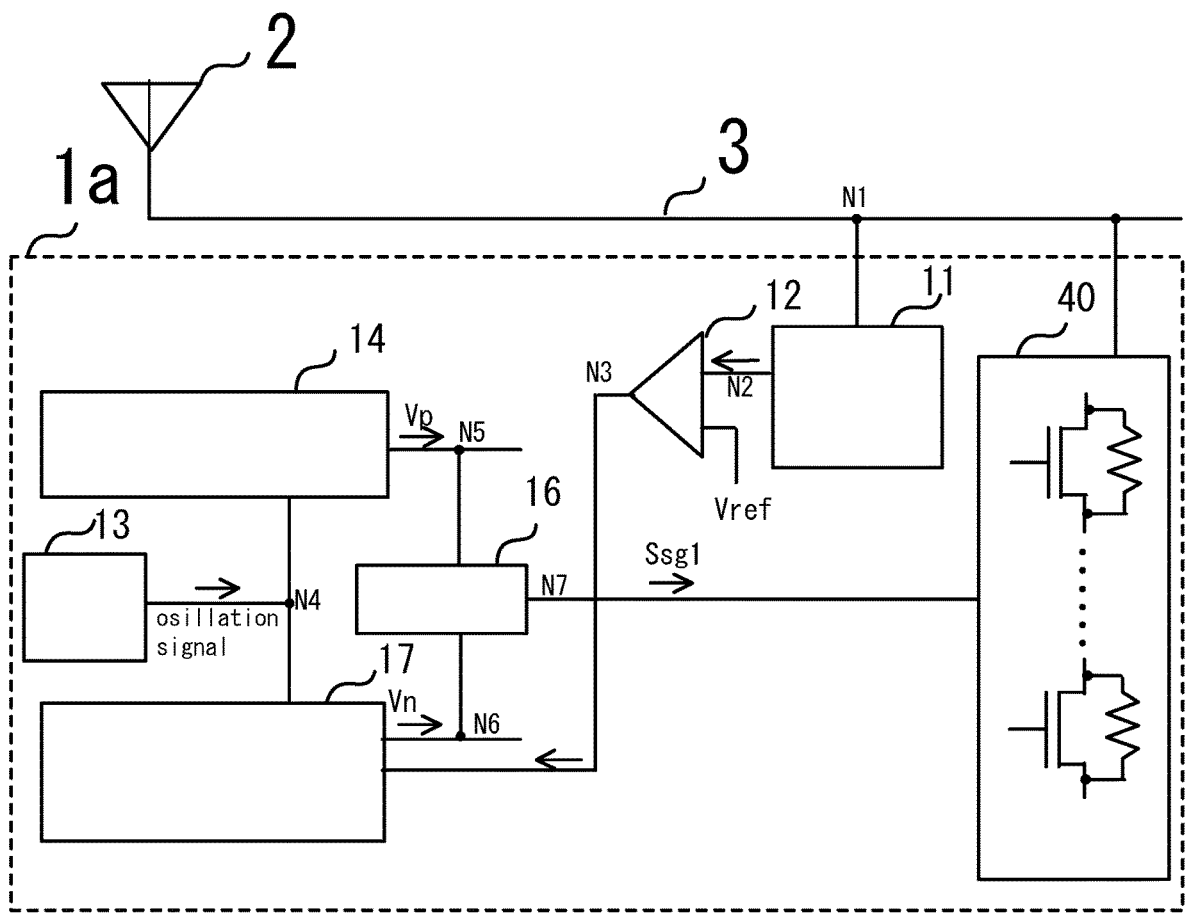
FIG. 7 is a circuit diagram showing an antenna tuning IC according to a second embodiment.

An antenna tuning IC according to a second embodiment will be described with reference to the drawings. FIG. 7 is a circuit diagram showing the antenna tuning IC.

In the second embodiment, the step-down charge pump circuit is made to have a standby function to generate two types of stepped-down voltages different from those in the first embodiment.

Hereinafter, the same component portions as in the first embodiment are denoted by the same reference numerals, and explanations of these portions will be omitted and only different portions will be described.

As shown in FIG. 7, an antenna tuning IC1a includes the full-wave rectifier circuit 11, the comparator 12, the ring oscillator 13, the boost charge pump circuit/boost regulator 14, a step-down charge pump circuit with a standby function/step-down regulator 17, the level shifter 16, and the RF switch circuitry 40. The antenna tuning IC1a is applied to smart phones, mobile phone terminals, mobile terminals, and the like, for example.

The step-down charge pump circuit with a standby function/step-down regulator 17 receives an oscillation signal (signal at node N4) output from the ring oscillator 13 and the output (signal at node N3) of the comparator 12. The step-down charge pump circuit with a standby function performs switching between active and standby based on the output (signal at node N3) of the comparator 12. The output is set to the stepped-down voltage Vn at the time of active, and the operation is stopped and the output becomes a ground potential Vss level at the time of standby. The step-down regulator feedback-processes the stepped-down voltage Vn generated by the step-down charge pump circuit with a standby function, and the output of the step-down regulator becomes the ground potential Vss level when the step-down charge pump circuit with the standby function stops operating.

The output of the step-down charge pump circuit with a standby function/step-down regulator 17 is set to the ground potential Vss when the output of the comparator 12 is at a low level ("L"). When the output of the comparator 12 is at a high level ("H"), the output of the step-down charge pump circuit/step-down regulator 17 with a standby function is set to the stepped-down voltage Vn (second negative voltage).

The level shifter 16 receives an output (signal at node N5 (boosted voltage Vp)) of the boost charge pump circuit/boost regulator 14 and an output (signal at node N6 (stepped-down voltage Vn)) of the step-down charge pump circuit with a standby function/step-down regulator 17, generates a level-shifted signal, and outputs the level-shifted signal to the RF switch circuitry 40 as a switch gate control signal Ssg1. The switch gate control signal Ssg1 output from the level shifter 16 is set to the boosted voltage Vp at the time of high level and set to the stepped-down voltage Vn (second negative voltage) or the ground potential Vss at the time of low level. The RF switch circuitry 40 is turned on and off by the switch gate control signal Ssg1 output from the level shifter 16.

Figure 8:
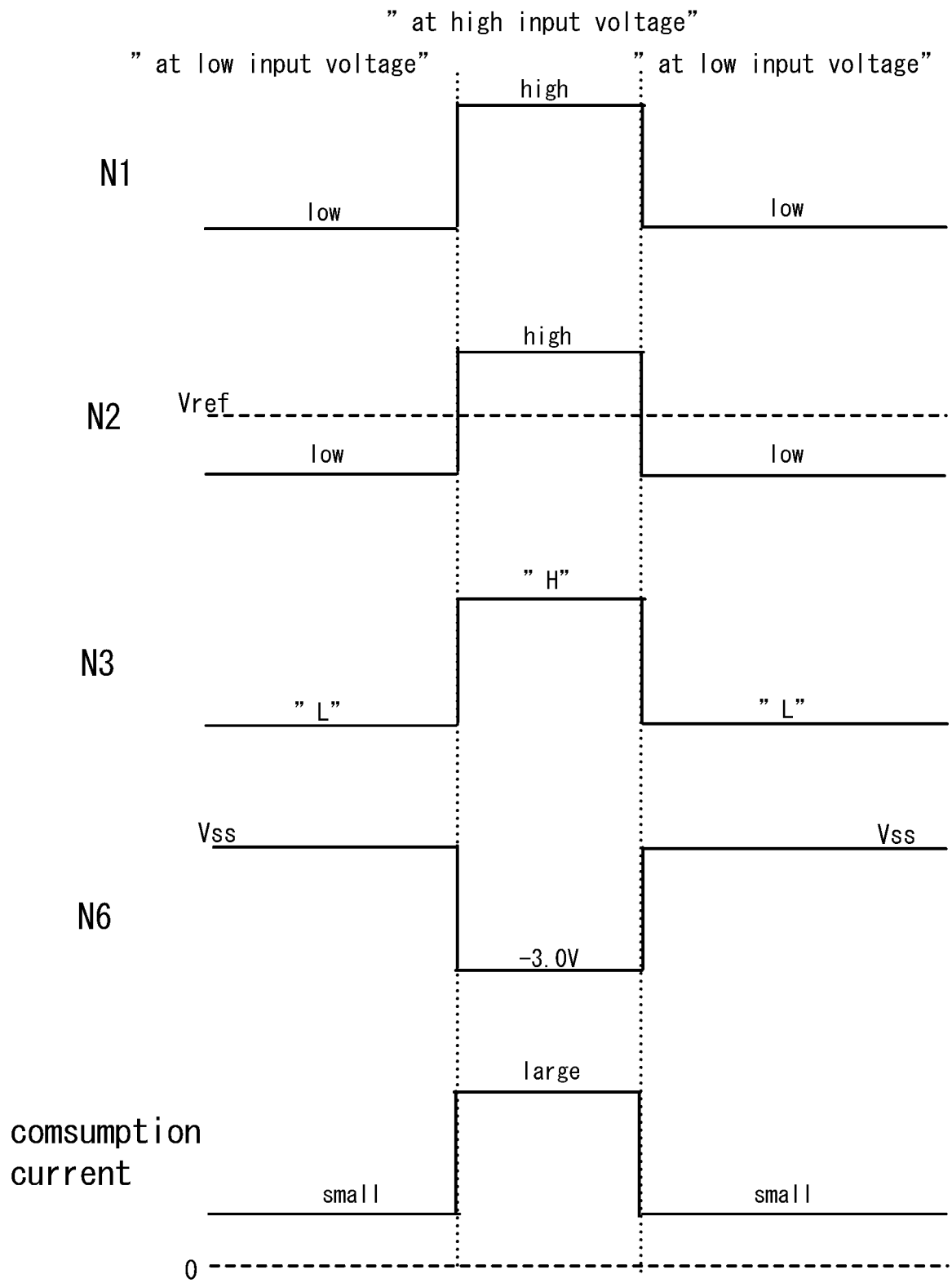
FIG. 8 is a timing chart showing the operation of the antenna tuning IC according to the second embodiment.

Next, an operation of the antenna tuning IC will be described with reference to FIG. 8. FIG. 8 is a timing chart showing the operation of the antenna tuning IC according to the embodiment.

As shown in FIG. 8, in the antenna tuning IC1a, the full-wave rectifier circuit 11 receives a reception signal received by the antenna 2 through the antenna line 3 (node N1). The full-wave rectifier circuit 11 detects the power level of the antenna line 3. The full-wave rectifier circuit 11 outputs a low voltage when the power level of the antenna line 3 is a low input voltage, and outputs a high voltage when the power level of the antenna line 3 is a high input voltage.

The comparator 12 receives an output signal of the full-wave rectifier circuit 11. The comparator 12 outputs a low level ("L") signal when the output of the full-wave rectifier circuit 11 falls below the reference voltage Vref, and outputs a high level ("H") signal when the output of the full-wave rectifier circuit 11 exceeds the reference voltage Vref.

The step-down charge pump circuit with a standby function/step-down regulator 17 receives an oscillation signal (signal at node N4) output from the ring oscillator 13 and the output (signal at node N3) of the comparator 12. When the output of the comparator 12 is at a low level ("L"), the step-down charge pump circuit with a standby function/step-down regulator 17 stands by to stop operating. As a result, the output becomes the ground potential Vss level, and a signal with the ground potential Vss level is output to the level shifter 16. When the output of the comparator 12 is at a high level ("H"), the step-down charge pump circuit with a standby function/step-down regulator 17 operates actively to generate a stepped-down voltage Vn of −3.0 V, for example, and outputs the generated stepped-down voltage Vn to the level shifter 16.

Here, the step-down charge pump circuit with a standby function/step-down regulator 17 stands by to stop operating when the output of the comparator 12 is at a low level ("L"). As a result, the stepped-down voltage Vn becomes the ground potential Vss. At this time, since the power level of the antenna line 3 is small, the RF switch circuitry 40 can be completely turned off by stopping the operation even at the ground potential Vss level.

In the antenna tuning IC1a according to the embodiment, when the power level of the antenna line 3 is a low input voltage, the step-down charge pump circuit with a standby function/step-down regulator 17 stops operating and outputs the stepped-down voltage Vn that is the ground potential Vss. When the power level of the antenna line 3 is a high input voltage, the step-down charge pump circuit with the standby function/step-down regulator 17 outputs a stepped-down voltage Vn of −3.0 V. The operating current (first operating current) of the step-down charge pump circuit with a standby function/step-down regulator 17 when generating the stepped-down voltage Vn that is the ground potential Vss is smaller than the operating current (second operating current) of the step-down charge pump circuit with the standby function/step-down regulator 17 when generating a stepped-down voltage Vn of −3.0 V.

As described above, the full-wave rectifier circuit 11, the comparator 12, the ring oscillator 13, the boost charge pump circuit/boost regulator 14, the step-down charge pump circuit with a standby function/step-down regulator 17, the level shifter 16, and the RF switch circuitry 40 are provided in the antenna tuning IC1*a* according to the embodiment. The full-wave rectifier circuit 11 functions as a power level detection circuit that detects the power level of the antenna line 3. The comparator 12 functions as a signal level determination circuit that determines the signal level detected by the full-wave rectifier circuit 11. The ring oscillator 13, the boost charge pump circuit/boost regulator 14, the step-down charge pump circuit/step-down regulator 17 with a standby function, and the level shifter 16 control the ON/OFF operation of the RF switch circuitry 40, and function as a consumption current control circuit that controls the consumption current of the antenna tuning IC1*a*. Based on the determination result output from the comparator 12, the step-down charge pump circuit/step-down regulator 17 with a standby function outputs the ground potential Vss when the power level of the antenna line 3 is a low input voltage, and outputs a stepped-down voltage Vn of −3.0 V when the power level of the antenna line 3 is a high input voltage. The level shifter 16 receives the boosted voltage Vp, which is a constant voltage generated by the boost charge pump circuit/boost regulator 14, the stepped-down voltage Vn of the ground potential Vss generated by the step-down charge pump circuit/step-down regulator 17 with a standby function, and a stepped-down voltage Vn of −3.0 V. The level shifter 16 outputs to the RF switch circuitry 40 the switch gate control signal Ssg1, which is set to the boosted voltage Vp at the time of high level, is set to a stepped-down voltage Vn of −3.0 V at the time of low level and when the power level is a high input voltage, and is set to the stepped-down voltage Vn that is the ground potential Vss at the time of low level and when the power level is a low input voltage.

For this reason, the first consumption current of the antenna tuning IC1*a* generated when the power level is a low input voltage can be reduced more than the second consumption current of the antenna tuning IC1*a* generated when the power level is a high input voltage. Therefore, the power consumption of the antenna tuning IC1*a* can be reduced. In addition, the effect of reducing the consumption current in the embodiment is the same as the effect of reducing the consumption current in the first embodiment.

Figure 9:
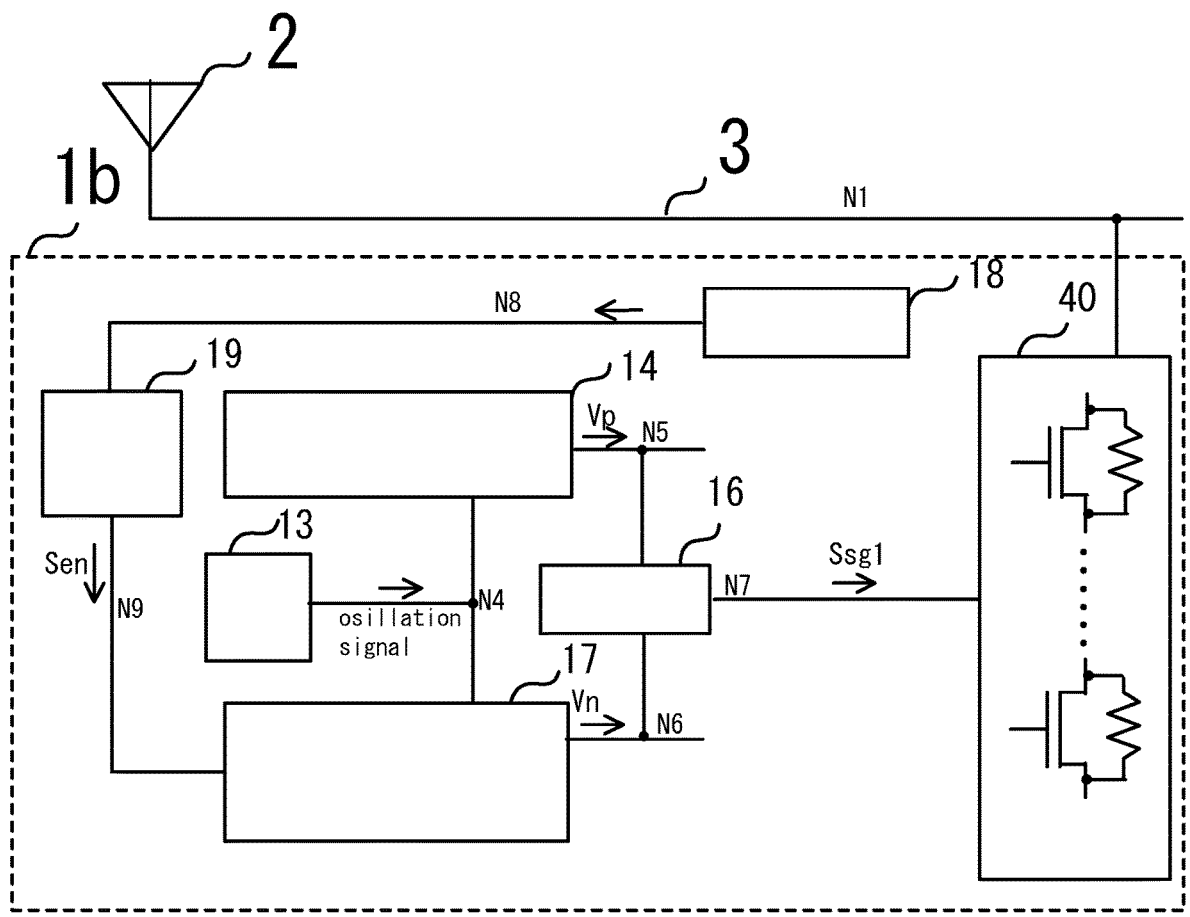
FIG. 9 is a circuit diagram showing an antenna tuning IC according to a third embodiment.

An antenna tuning IC according to a third embodiment will be described with reference to the drawings. FIG. 9 is a circuit diagram showing the antenna tuning IC.

In the third embodiment, the power level of the antenna line is detected by a directional coupler, and the detected signal level is determined by a control circuitry (controller).

Hereinafter, the same component portions as in the first embodiment are denoted by the same reference numerals, and explanations of these portions will be omitted and only different portions will be described.

As shown in FIG. 9, an antenna tuning IC1*b* includes a directional coupler 18, a control circuitry (controller) 19, the ring oscillator 13, the boost charge pump circuit/boost regulator 14, a step-down charge pump circuit with a standby function/step-down regulator 17, the level shifter 16, and the RF switch circuitry 40. The antenna tuning IC1*b* is applied to smart phones, mobile phone terminals, mobile terminals, and the like, for example.

The directional coupler 18 is a measuring device inserted into the transmission line, and is a 4-port circuit configured as a 3-terminal or 4-terminal device, for example. The directional coupler 18 functions as a power level detection circuit that detects the power level (node N1) of the antenna line 3.

The control circuitry (controller) 19 receives the signal (signal at node N8) detected by the directional coupler 18 and generates a control signal Sen according to the power level of the directional coupler 18. The control circuitry (controller) 19 generates a high level ("H") control signal Sen when it is determined that the power level of the antenna line 3 is a high input voltage, and generates a low level ("L") control signal Sen when it is determined that the power level of the antenna line 3 is a low input voltage.

The step-down charge pump circuit with a standby function/step-down regulator 17 receives an oscillation signal (signal at node N4) output from the ring oscillator 13 and the output (signal at node N9) of the control circuitry (controller) 19. The step-down charge pump circuit with a standby function performs switching between active and standby based on the output (signal at node N9) of the control circuitry (controller) 19. The output is set to the stepped-down voltage Vn at the time of active, and the operation is stopped and the output becomes a ground potential Vss level at the time of standby. The step-down regulator feedback-processes the stepped-down voltage Vn generated by the step-down charge pump circuit with a standby function, and the output of the step-down regulator becomes the ground potential Vss level when the step-down charge pump circuit with the standby function stops operating.

The output of the step-down charge pump circuit with a standby function/step-down regulator 17 is set to the ground potential Vss when the output of the control circuitry (controller) 19 is at a low level ("L"). When the output of the control circuitry (controller) 19 is at a high level ("H"), the output of the step-down charge pump circuit with a standby function/step-down regulator 17 is set to the stepped-down voltage Vn (second negative voltage).

The level shifter 16 receives an output (signal at node N5 (boosted voltage Vp)) of the boost charge pump circuit/boost regulator 14 and an output (signal at node N6 (stepped-down voltage Vn)) of the step-down charge pump circuit with a standby function/step-down regulator 17, generates a level-shifted signal, and outputs the level-shifted signal to the RF switch circuitry 40 as a switch gate control signal Ssg1. The switch gate control signal Ssg1 output from the level shifter 16 is set to the boosted voltage Vp at the time of high level and set to the stepped-down voltage Vn (second negative voltage) or the ground potential Vss at the time of low level. The RF switch circuitry 40 is turned on and off by the switch gate control signal Ssg1 output from the level shifter 16.

Figure 10:
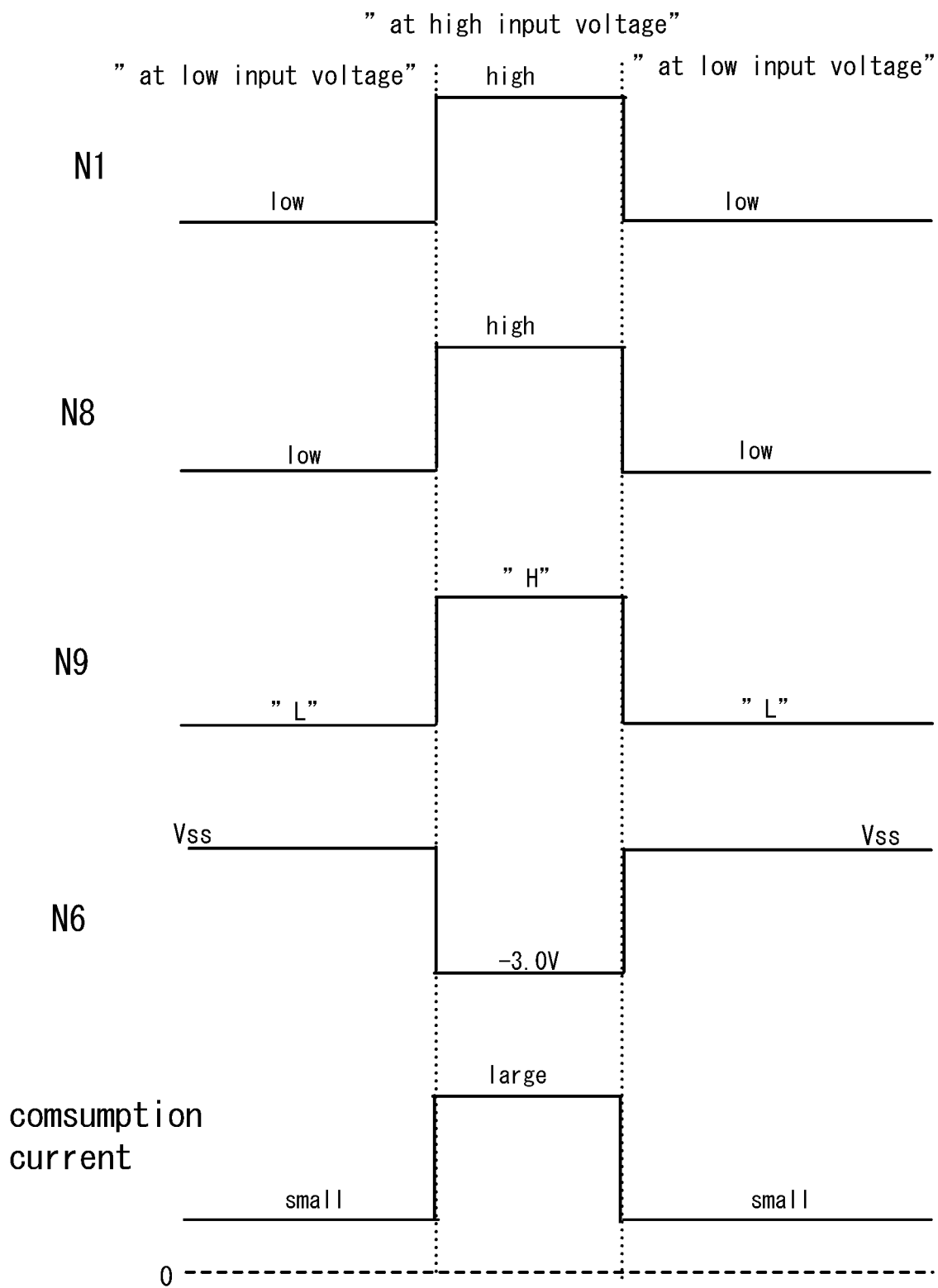
FIG. 10 is a timing chart showing the operation of the antenna tuning IC according to the third embodiment.

Next, an operation of the antenna tuning IC will be described with reference to FIG. 10. FIG. 10 is a timing chart showing the operation of the antenna tuning IC according to the embodiment.

As shown in FIG. 10, in the antenna tuning IC1*b*, the directional coupler 18 receives a reception signal received by the antenna 2 through the antenna line 3 (node N1). The directional coupler 18 detects the power level of the antenna line 3.

The control circuitry (controller) 19 receives an output signal (signal at node N8) of the directional coupler 18. The control circuitry (controller) 19 outputs a low level ("L") signal when it is determined that the power level of the antenna line 3 is a low input voltage, and outputs a high level ("H") signal when it is determined that the power level of the antenna line 3 is a high input voltage.

The step-down charge pump circuit with a standby function/step-down regulator 17 receives an oscillation signal (signal at node N4) output from the ring oscillator 13 and the output signal (signal at node N9) of the control circuitry (controller) 19. When the output of the control circuitry (controller) 19 is at a low level ("L"), the step-down charge pump circuit with a standby function/step-down regulator 17 stands by to stop operating. As a result, the output becomes the ground potential Vss level, and a signal with the ground potential Vss level is output to the level shifter 16. When the output of the control circuitry (controller) 19 is at a high level ("H"), the step-down charge pump circuit with a standby function/step-down regulator 17 operates actively to generate a stepped-down voltage Vn of −3.0 V, for example, and outputs the generated stepped-down voltage Vn to the level shifter 16.

Here, the step-down charge pump circuit with a standby function/step-down regulator 17 stands by to stop operating when the output of the control circuitry (controller) 19 is at a low level ("L"). As a result, the stepped-down voltage Vn becomes the ground potential Vss. At this time, since the power level of the antenna line 3 is small, the RF switch circuitry 40 can be completely turned off by stopping the operation even at the ground potential Vss level.

In the antenna tuning IC1b according to the embodiment, when the power level of the antenna line 3 is a low input voltage, the step-down charge pump circuit with a standby function/step-down regulator 17 stops operating and outputs the stepped-down voltage Vn that is the ground potential Vss. When the power level of the antenna line 3 is a high input voltage, the step-down charge pump circuit with the standby function/step-down regulator 17 outputs a stepped-down voltage Vn of −3.0 V. The operating current (first operating current) of the step-down charge pump circuit with a standby function/step-down regulator 17 when generating the stepped-down voltage Vn that is the ground potential Vss is smaller than the operating current (second operating current) of the step-down charge pump circuit with the standby function/step-down regulator 17 when generating a stepped-down voltage Vn of −3.0 V.

As described above, the directional coupler 18, the control circuitry (controller) 19, the ring oscillator 13, the boost charge pump circuit/boost regulator 14, the step-down charge pump circuit with a standby function/step-down regulator 17, the level shifter 16, and the RF switch circuitry 40 are provided in the antenna tuning IC1b according to the third embodiment. The directional coupler 18 functions as a power level detection circuit that detects the power level of the antenna line 3. The control circuitry (controller) 19 functions as a signal level determination circuit that determines the signal level detected by the directional coupler 18. The ring oscillator 13, the boost charge pump circuit/boost regulator 14, the step-down charge pump circuit with a standby function/step-down regulator 17, and the level shifter 16 control the ON/OFF operation of the RF switch circuitry 40, and function as a consumption current control circuit that controls the consumption current of the antenna tuning IC1b. Based on the determination result output from the control circuitry (controller) 19, the step-down charge pump circuit with a standby function/step-down regulator 17 outputs the ground potential Vss when the power level of the antenna line 3 is a low input voltage, and outputs a stepped-down voltage Vn of −3.0 V when the power level of the antenna line 3 is a high input voltage. The level shifter 16 receives the boosted voltage Vp, which is a constant voltage generated by the boost charge pump circuit/boost regulator 14, the stepped-down voltage Vn of the ground potential Vss generated by the step-down charge pump circuit with a standby function/step-down regulator 17, and a stepped-down voltage Vn of −3.0 V. The level shifter 16 outputs to the RF switch circuitry 40 the switch gate control signal Ssg1, which is set to the boosted voltage Vp at the time of high level, is set to a stepped-down voltage Vn of −3.0 V at the time of low level and when the power level is a high input voltage, and is set to the stepped-down voltage Vn that is the ground potential Vss at the time of low level and when the power level is a low input voltage.

For this reason, the first consumption current of the antenna tuning IC1b generated when the power level is a low input voltage can be reduced more than the second consumption current of the antenna tuning IC1b generated when the power level is a high input voltage. Therefore, the power consumption of the antenna tuning IC1b can be reduced. In addition, the effect of reducing the consumption current in the embodiment is the same as the effect of reducing the consumption current in the first embodiment.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An antenna tuning IC comprising:
a power level detection circuit configured to detect a power level of an antenna line through which a high-frequency signal received by an antenna is transmitted;
a signal level determination circuit configured to determine a signal level detected by the power level detection circuit; and
a consumption current control circuit configured to generate a switch gate control signal for controlling an ON/OFF operation of an RF switch circuitry and reduce a first consumption current generated when the power level is a low input voltage more than a second consumption current generated when the power level is a high input voltage based on a determination result of the signal level determination circuit.

2. The antenna tuning IC according to claim 1, wherein the consumption current control circuit sets a voltage when the switch gate control signal is at a low level to a first negative voltage or a ground potential when the power level is a low input voltage, and sets the voltage when the switch gate control signal is at the low level to a second negative voltage having a larger absolute value than the first negative voltage when the power level is a high input voltage.

3. The antenna tuning IC according to claim 2, wherein the consumption current control circuit includes a step-down charge pump circuit/step-down regulator, and the step-down charge pump circuit/step-down regulator generates the first negative voltage and the second negative voltage based on the determination result of the signal level determination circuit.

4. The antenna tuning IC according to claim 3, wherein the consumption current control circuit further includes a ring oscillator, a boost charge pump circuit/boost regulator, and a level shifter,
the ring oscillator generates an oscillation signal,
the boost charge pump circuit/boost regulator receives the oscillation signal output from the ring oscillator and generates a boosted voltage based on the oscillation signal, and the level shifter receives an output of the step-down charge pump circuit/step-down regulator and an output of the boost charge pump circuit/boost regulator and outputs a level-shifted signal to the RF switch circuitry as the switch gate signal.

5. The antenna tuning IC according to claim 2, wherein the consumption current control circuit includes a step-down charge pump circuit with a standby function/step-down regulator, and the step-down charge pump circuit with the standby function/step-down regulator generates the second negative voltage and the ground potential based on the determination result of the signal level determination circuit.

6. The antenna tuning IC according to claim 5, wherein the consumption current control circuit further includes a ring oscillator, a boost charge pump circuit/boost regulator, and a level shifter, the ring oscillator generates an oscillation signal, the boost charge pump circuit/boost regulator receives the oscillation signal output from the ring oscillator and generates a boosted voltage based on the oscillation signal, and the level shifter receives an output of the step-down charge pump circuit with the standby function/step-down regulator and an output of the boost charge pump circuit/boost regulator and outputs a level-shifted signal to the RF switch circuitry as the switch gate signal.

7. The antenna tuning IC according to claim 1, wherein a full-wave rectifier circuit or a directional coupler is used as the power level detection circuit.

8. The antenna tuning IC according to claim 1, wherein a comparator or a controller is used as the signal level determination circuit.

9. The antenna tuning IC according to claim 1, wherein the RF switch circuitry includes multi-stage MOS transistors having gates to which the switch gate control signal is input.

10. The antenna tuning IC according to claim 1, wherein the antenna tuning IC is applied to smartphones, mobile phone terminals, and mobile terminals.

11. The antenna tuning IC according to claim 1, wherein the antenna tuning IC is provided between the antenna and an analog front module, and is used for antenna aperture tuning to adjust the antenna to a good position for radio waves by using switching of the RF switch circuitry.

* * * * *